United States Patent
Cheng et al.

(10) Patent No.: US 11,488,303 B2
(45) Date of Patent: Nov. 1, 2022

(54) SYSTEM OF DEEP LEARNING NEURAL NETWORK IN PROSTATE CANCER BONE METASTASIS IDENTIFICATION BASED ON WHOLE BODY BONE SCAN IMAGES

(71) Applicant: China Medical University Hospital, Taichung (TW)

(72) Inventors: Da-Chuan Cheng, Taichung (TW); Chia-Chuan Liu, Taichung (TW); Chia-Hung Kao, Taipei (TW); Te-Chun Hsieh, Taichung (TW)

(73) Assignee: CHINA MEDICAL UNIVERSITY HOSPITAL, Taichung (TW)

( * ) Notice: Subject to any disclaimer, the term of this patent is extended or adjusted under 35 U.S.C. 154(b) by 63 days.

(21) Appl. No.: 17/019,416

(22) Filed: Sep. 14, 2020

(65) Prior Publication Data
US 2021/0118128 A1    Apr. 22, 2021

(30) Foreign Application Priority Data
Oct. 16, 2019    (TW) .................................. 108137163

(51) Int. Cl.
   *G06K 9/00*       (2022.01)
   *G06T 7/00*       (2017.01)
   *G06N 3/04*       (2006.01)

(52) U.S. Cl.
   CPC ......... *G06T 7/0012* (2013.01); *G06N 3/0454* (2013.01); *G06T 2207/20081* (2013.01);
   (Continued)

(58) Field of Classification Search
   CPC ......... G06T 7/0012; G06T 2207/20081; G06T 2207/20084; G06T 2207/30008; G06T 2207/30081; G06N 3/0454
   (Continued)

(56) References Cited

FOREIGN PATENT DOCUMENTS

TW      201941218 A      10/2019

OTHER PUBLICATIONS

Ghesu, Florin-Cristian, et al. "Multi-scale deep reinforcement learning for real-time 3D-landmark detection in CT scans." IEEE transactions on pattern analysis and machine intelligence 41.1 (2017): 176-189. (Year: 2017).*

(Continued)

*Primary Examiner* — Jonathan S Lee
(74) *Attorney, Agent, or Firm* — Bacon & Thomas, PLLC (57) ABSTRACT

A system of deep learning neural network in prostate cancer bone metastasis identification based on whole body bone scan images includes a pre-processing module for receiving input whole body bone scan images, and a neural network module for detecting whether there is a prostate cancer bone metastasis. The neural network module includes: a chest portion network module for establishing first stage faster R-CNN and segmenting training images of chest portion according to the input whole body bone scan images, and using the training images to train second stage faster R-CNN and categorizing the lesions of cancerous bone metastasis; and a pelvis portion network module for establishing first stage faster R-CNN and segmenting training images of pelvis portion according to the input whole body bone scan images, and using the training images to train the convolutional neural network to categorize whether it is a bone metastasis image.

13 Claims, 12 Drawing Sheets

(52) U.S. Cl.
CPC .............. *G06T 2207/20084* (2013.01); *G06T 2207/30008* (2013.01); *G06T 2207/30081* (2013.01)

(58) Field of Classification Search
USPC ........................................................ 382/128
See application file for complete search history.

(56) References Cited

OTHER PUBLICATIONS

Ren, Shaoqing, et al. "Faster r-cnn: Towards real-time object detection with region proposal networks." Advances in neural information processing systems 28 (2015). (Year: 2015).*

Chmelik, Jiri, et al. "Deep convolutional neural network-based segmentation and classification of difficult to define metastatic spinal lesions in 3D CT data." Medical image analysis 49 (2018): 76-88. (Year: 2018).*

* cited by examiner

|   | 1 imageFilename | 2 category |
|---|---|---|
| 1 | "TestCIM_0001.png" | 1 |
| 2 | "TestCIM_0001_3.png" | 1 |
| 3 | "TestCIM_0001_4.png" | 1 |
| 4 | "TestCIM_0002.png" | 2 |

SYSTEM OF DEEP LEARNING NEURAL NETWORK IN PROSTATE CANCER BONE METASTASIS IDENTIFICATION BASED ON WHOLE BODY BONE SCAN IMAGES

BACKGROUND

1. Field of the Disclosure

The present disclosure relates to a prostate cancer bone metastasis identification system and, more particularly, to a system of deep learning neural network in prostate cancer bone metastasis identification based on whole body bone scan images.

2. Description of Related Art

In the whole body bone scan image, the doctor must distinguish, in a hot zone, which is normal osteogenesis, which is caused by prostate cancer cells, and which is caused by injury, so that the doctor has to perform diagnosis and determination on each image to make a definite diagnosis of prostate cancer bone metastasis. Typically, most of the locations affected by prostate cancer bone metastasis are the scapula, ribs, spine, hip joint, limbs, and the like. However, to distinguish whether the hot zone is cancerous bone metastasis or normal bone cell reaction through the human eyes, it not only requires an experienced nuclear medicine doctor, but also takes a long time for the doctor to interpret. Therefore, after working for a long time, inevitable human misjudgments may be encountered. At the same time, although there are general rules for the interpretation of images by doctors, there is no absolute standard, so that the interpretation results of different doctors may also vary due to the amount of experience. Therefore, the work of diagnosing images is very labor-intensive and, once the number of cases increases, it is a huge expense in manpower and time.

In view of this, there is a need to establish an early diagnosis identification system to assist doctors in identifying prostate cancer bone metastasis.

SUMMARY

The object of the present disclosure is to provide a system of deep learning neural network in prostate cancer bone metastasis identification based on whole body bone scan images for correctly distinguishing the type of hot zone as metastasis, injury or normal bone hyperplasia.

In one aspect of the present disclosure, there is provided a system of deep learning neural network in prostate cancer bone metastasis identification based on whole body bone scan images, which includes: a pre-processing module, which receives input whole-body bone scan images to perform processing; and a neural network module, which detects whether there is a prostate cancer bone metastasis based on the input whole body bone scan images, and includes: a chest portion network module, which establishes a first stage faster region-based convolutional neural network, segments training images of chest portion based on the input whole body bone scan images, uses the training images to train a second stage faster region-based convolutional neural network, and categorizes lesions of cancerous bone metastasis; and a pelvis portion network module using a convolutional neural network, which establishes a first stage faster region-based convolutional neural network, segments training images of pelvis portion based on the input whole body bone scan images, uses the training images to train the convolutional neural network, and categorizes whether the pelvis portion is a bone metastasis image.

In another aspect of the present disclosure, there is provided a computer readable memory media storing a software program for use in a computer device. The computer device has an operating system used for a system of deep learning neural network in prostate cancer bone metastasis identification based on whole body bone scan images. The software program includes: a pre-processing module, which receives input whole-body bone scan images to perform processing; and a neural network module, which detects whether there is a prostate cancer bone metastasis based on the input whole body bone scan images, and includes: a chest portion network module, which establishes a first stage faster region-based convolutional neural network, segments training images of chest portion based on the input whole body bone scan images, uses the training images to train a second stage faster region-based convolutional neural network, and categorizes lesions of cancerous bone metastasis; and a pelvis portion network module using a convolutional neural network, which establishes a first stage faster region-based convolutional neural network, segments training images of pelvis portion based on the input whole body bone scan images, uses the training images to train the convolutional neural network, and categorizes whether the pelvis portion is a bone metastasis image.

Other objects, advantages, and novel features of the disclosure will become more apparent from the following detailed description when taken in conjunction with the accompanying drawings.

DETAILED DESCRIPTION

The following embodiments describe the implementation and operation principles of the system of deep learning neural network in prostate cancer bone metastasis identification based on whole body bone scan images in the present disclosure. Those skilled in the art to which the present disclosure pertains may understand the features and effects of this disclosure through the above-mentioned embodiments, and may perform combination, modification, replacement or adaption based on the spirit of the present disclosure.

The term "connected" as used herein refers to aspects such as direct connection or indirect connection, and is not limited thereto. The term "when . . . " herein may denote "during the time that . . . ", "before . . . ", or "after . . . " and is not limited thereto.

The ordinals recited herein such as "first", "second" and so on are intended only to describe the elements claimed and imply or represent neither that the claimed elements have any preceding ordinals, nor that sequence between one claimed element and another claimed element or between steps of a manufacturing method. The use of these ordinals is merely to differentiate one claimed element having a certain designation from another claimed element having the same designation.

When multiple effects (or elements) are described herein, if the term "or" is used between the multiple effects (or elements), it means that the effects (or elements) may exist independently, but it does not exclude that the multiple effects (or elements) may coexist. In other words, as long as the description is reasonable, the term "or" may involve the meaning of "and".

Furthermore, the following various embodiments of the system of deep learning neural network in prostate cancer bone metastasis identification based on whole body bone scan images of the present disclosure can be implemented through software programs or electronic circuits, and are not limited thereto.

The system of deep learning neural network in prostate cancer bone metastasis identification based on whole body bone scan images of the present disclosure is provided to design a neural network to detect whether there is prostate cancer bone metastasis based on the whole body bone scan image. In the establishment of the neural network, according to the suggestions of the doctor, the human body may be segmented into five metastasis-prone parts, including the shoulder, chest (including ribs), spine, pelvis and thigh. In order to train the human body parts separately into a neural network, the human body is divided into two major metastasis-prone parts including the chest (including shoulders and spine) and the pelvis (including thighs), considering the number of metastasis points of each part and the chest including the shoulders and spine, and the pelvis part including the thigh according to the division of the human body, so as to train these two major metastasis-prone portions (chest portion and pelvis portion). According to different shapes of the metastasis points in which the rib part is primarily provided with small metastasis points, and most of the small metastasis points are scattered on the ribs and spine, the selection of neural network is made to the faster region-based convolutional neural network, hereinafter abbreviated as faster R-CNN, that can circle the positions of the metastasis points. Because the metastasis points of the pelvis are mostly large-area or large-scale metastases, the convolutional neural network is used to directly classify whether the images are cancer bone metastasis images.

Figure 1:
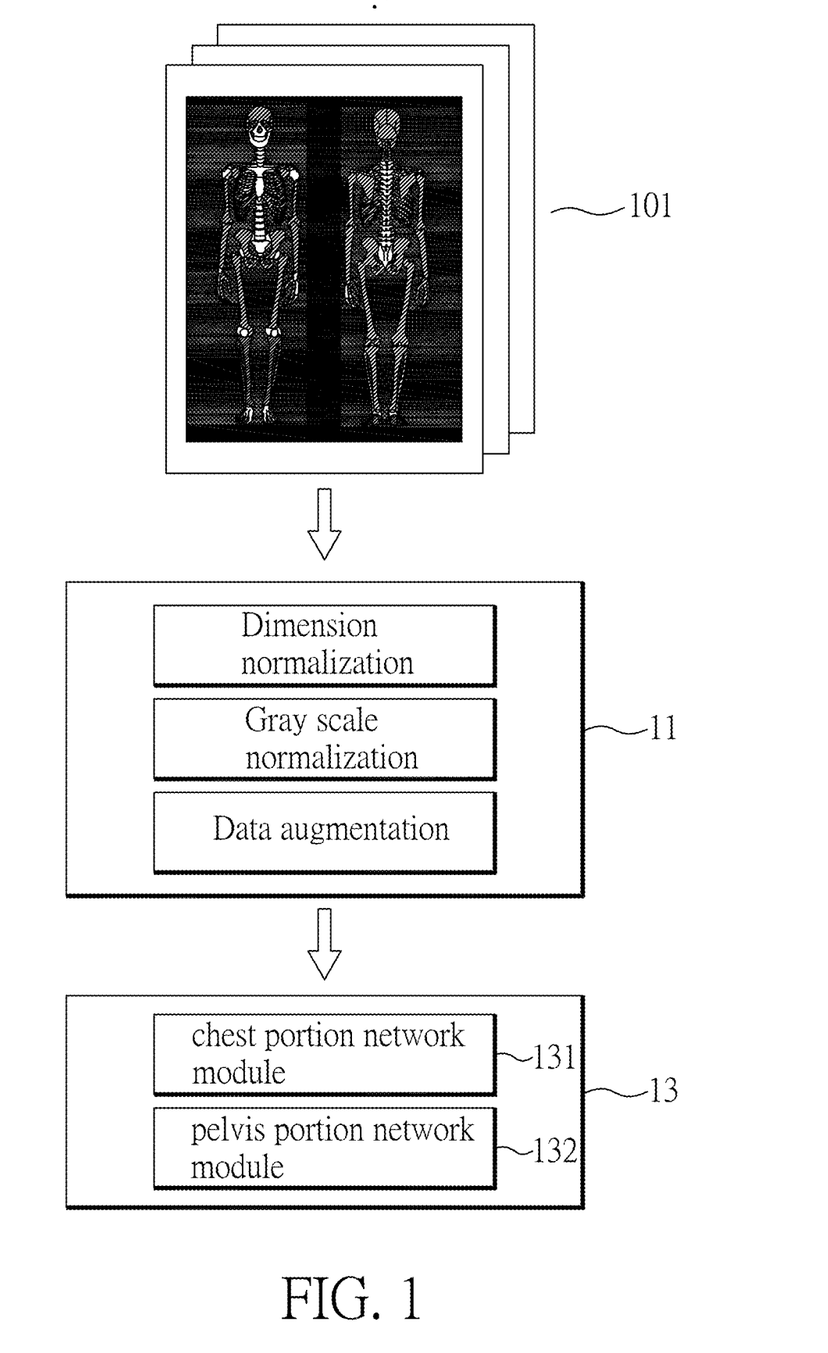
FIG. 1 schematically illustrates a system of deep learning neural network in prostate cancer bone metastasis identification based on whole body bone scan images according to the present disclosure.

FIG. 1 schematically illustrates the system of deep learning neural network in prostate cancer bone metastasis identification based on whole body bone scan images according to the present disclosure, which includes a pre-processing module 11 and a neural network module 13. The pre-processing module 11 receives input images 101, wherein the input images 101 for training are multiple sets (for example, 156 sets) of whole body bone scan images. These images are, for example, images of patients acquired by a GE double-headed gamma camera machine. Each set of patent's images includes bone scan images of front side and back side. There are, for example, 65 sets of images confirmed as prostate bone metastases (metastasis points visible on the images), and the others are images of patients with prostate cancer that are confirmed as not yet encountering cancer bone metastasis.

The aforementioned pre-processing module 11 performs the following processing on the input images 101 to obtain the pre-processed input images 101:

(1) Dimension normalization: The bone scan images of front side and back side are arranged to the left and right, and are cut to a predetermined size, for example, 512×950 (pixel×pixel), so as to normalize the image size.

Figure 2A:
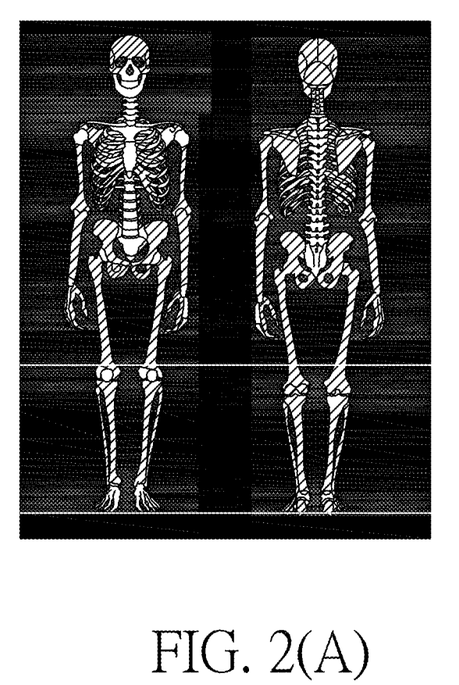
FIG. 2(A) shows a segmentation range of lower leg according to an embodiment of the present disclosure.
Figure 2B:
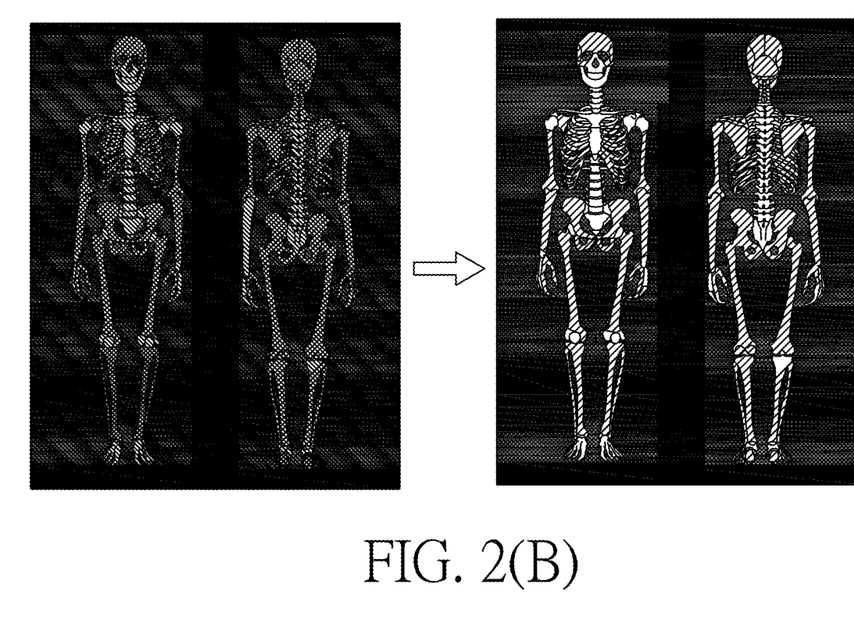
FIG. 2(B) shows images before and after linear conversion according to an embodiment of the present disclosure.

(2) Gray scale normalization: Linear conversion is used to automatically adjust the dynamic range of the image for being saved as a predetermined image format, such as a png image format. Two thresholds are defined in which the lower threshold is fixed to be 0 and the upper threshold is adjusted, based on the principle that the limbs are clearly visible, to segment the image into the range from the lower leg to the foot sole. The division is employed to accumulate the sum of gray scales of each row in the image to make the cumulative gray scale histogram, and to define the threshold for dividing the human body and the background, in which the sum of gray scales being greater than 200 represents the human body range, and the lower leg is 25% of the human body in height (calculated from the foot sole), so as to cut this image as shown by the horizontal lines of FIG. 2(A). According to the image segmented within the lines in FIG. 2(A), the upper threshold of the linear conversion is defined. The linear formula is expressed as the following equation (1), in which $f(r,c)$ represents the whole body image, $g(r,c)$ is the converted gray scale, a is the lower threshold of linear conversion which is 0, and b is the upper threshold of linear conversion, so that the gray scale of the converted image is between 0 and 255. The upper threshold b is expressed by equation (2), in which $k(r,c)$ represents the image of lower leg (the range within the horizontal lines), d is a constant value, and the gray scale being 50 is the threshold that makes the lower leg clearly visible. When these conditions are satisfied, the lower leg contour of the converted image is clearly visible. The threshold b is also used as the upper threshold of the linear conversion equation (1) of the entire image. FIG. 2(B) shows the images before and after linear conversion. The left side is the image before linear conversion and the right side is the image after linear conversion. The image of the right side is better than that of the left side in terms of contrast, which is also beneficial to the doctor's diagnosis. This image is also used as the training image of the neural network.

$$g(r, c) = \begin{cases} 0, & \text{if } f(r, c) < a \\ \dfrac{f(r, c) - a}{b - a} \times 255, & \text{if } a \leq f(r, c) \leq b \\ 255, & \text{if } f(r, c) > b \end{cases} \quad (1)$$

$$\left\{ b, \quad k(r, c) = \dfrac{k(r, c) - a}{b - a} \times 255 \text{ if } \dfrac{k(r, c) \geq 50}{k(r, c)} \geq d \right. \quad (2)$$

Figure 2C:
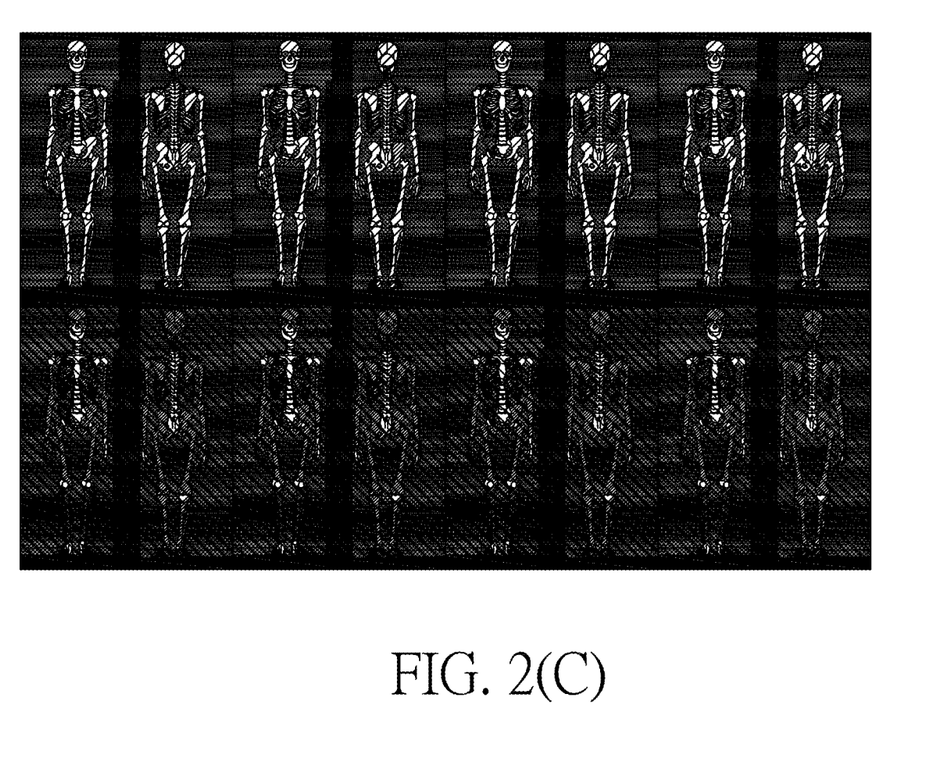
FIG. 2(C) shows an image with 8 different ranges of data augmentation according to an embodiment of the present disclosure.

(3) Data Augmentation: By adjusting the dynamic range of the image, one image is adjusted to have multiple types (such as 8 types) of brightness contrast. The adjustment method is expressed by the following equation (3) and equation (4), in which linear conversion with 8 upper thresholds is used, and the upper threshold c is used to adjust the image. The value of c will be adjusted according to the maximum value of the gray scale of the original image f(r,c). The adjusted 8 dynamic range images are shown in FIG. 2(C), wherein only the portion adjusted to be dark is performed in consideration that the image adjusted to be bright makes the image of the patient without bone metastasis as the condition of high-dose bone of the patient with bone metastasis.

$$g(r, c) = \begin{cases} 0, & \text{if } f(r, c) < a \\ \dfrac{f(r, c) - a}{c - a} \times 255, & \text{if } a \leq f(r, c) \leq c \\ 255, & \text{if } f(r, c) > c \end{cases} \quad (3)$$

$$c = b + [\max(graylevel) - b] \times \dfrac{n}{7}, \quad n = 0 \sim 7 \quad (4)$$

With reference to FIG. 1 again, the aforementioned pre-processed input images 101 are input to the neural network module 13 for performing subsequent network training of metastasis image categorization after image division and image point metastasis.

Figure 3:
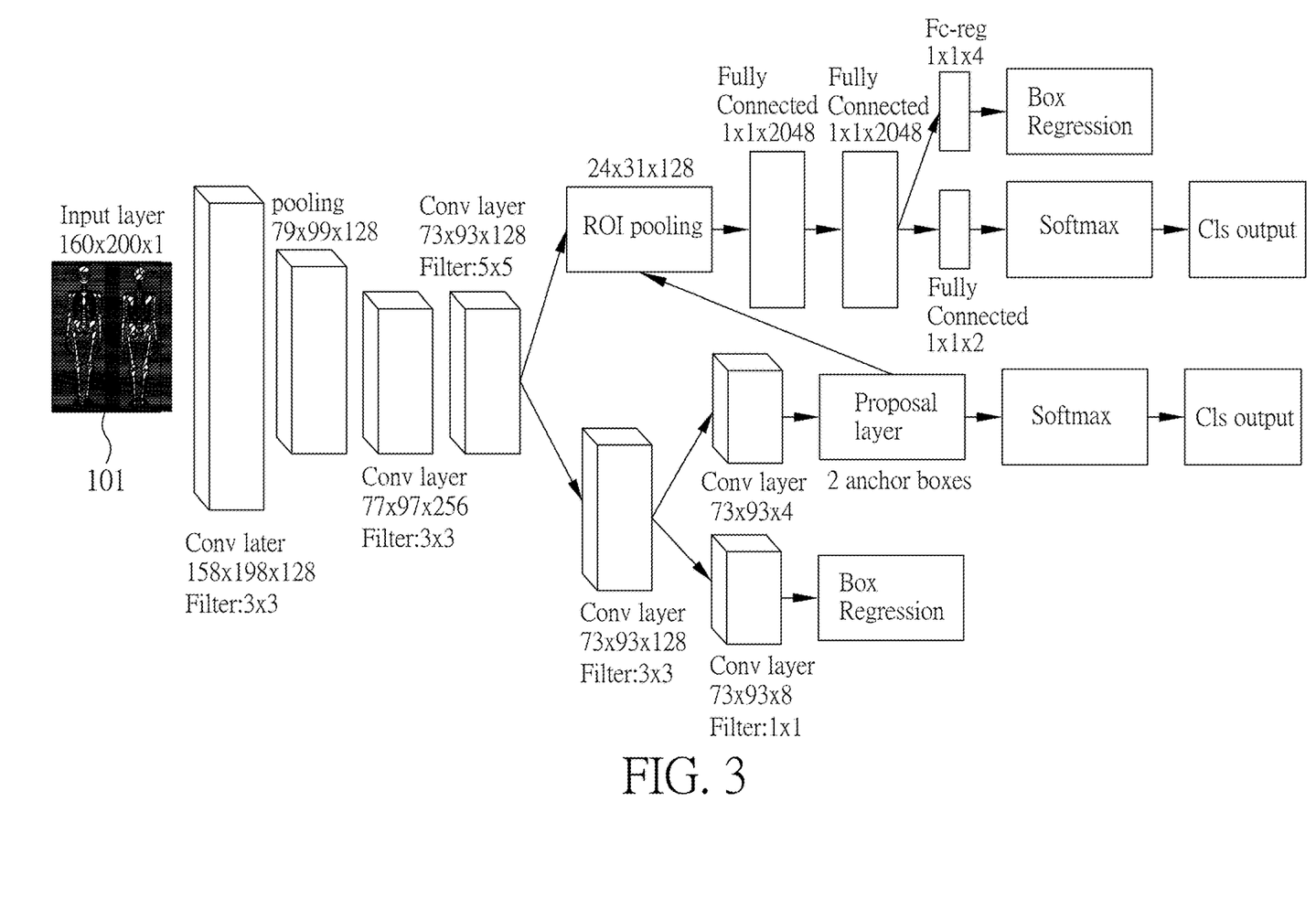
FIG. 3 shows a neural network architecture according to an embodiment of the present disclosure.

The neural network module 13 includes a chest portion network module 131 and a pelvis portion network module 132. The pre-processed input images 101 are input to the chest portion network module 131 and the pelvis portion network module 132, respectively. The faster R-CNN architectures used by the aforementioned chest portion network module 131 and pelvis portion network module 132 are the same as the neural network architecture shown in FIG. 3, wherein the size of the input image 101 in FIG. 3 is 160×200 (pixel×pixel) and, since the neural network architecture of FIG. 3 is known to those skilled in the art, a detailed description therefor is deemed unnecessary.

Figure 2D:
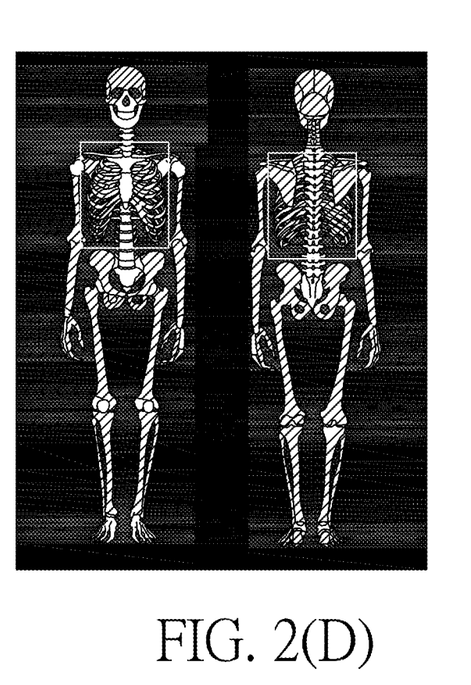
FIG. 2(D) schematically illustrates a label (bounding box) of rib according to an embodiment of the present disclosure.
Figure 4:
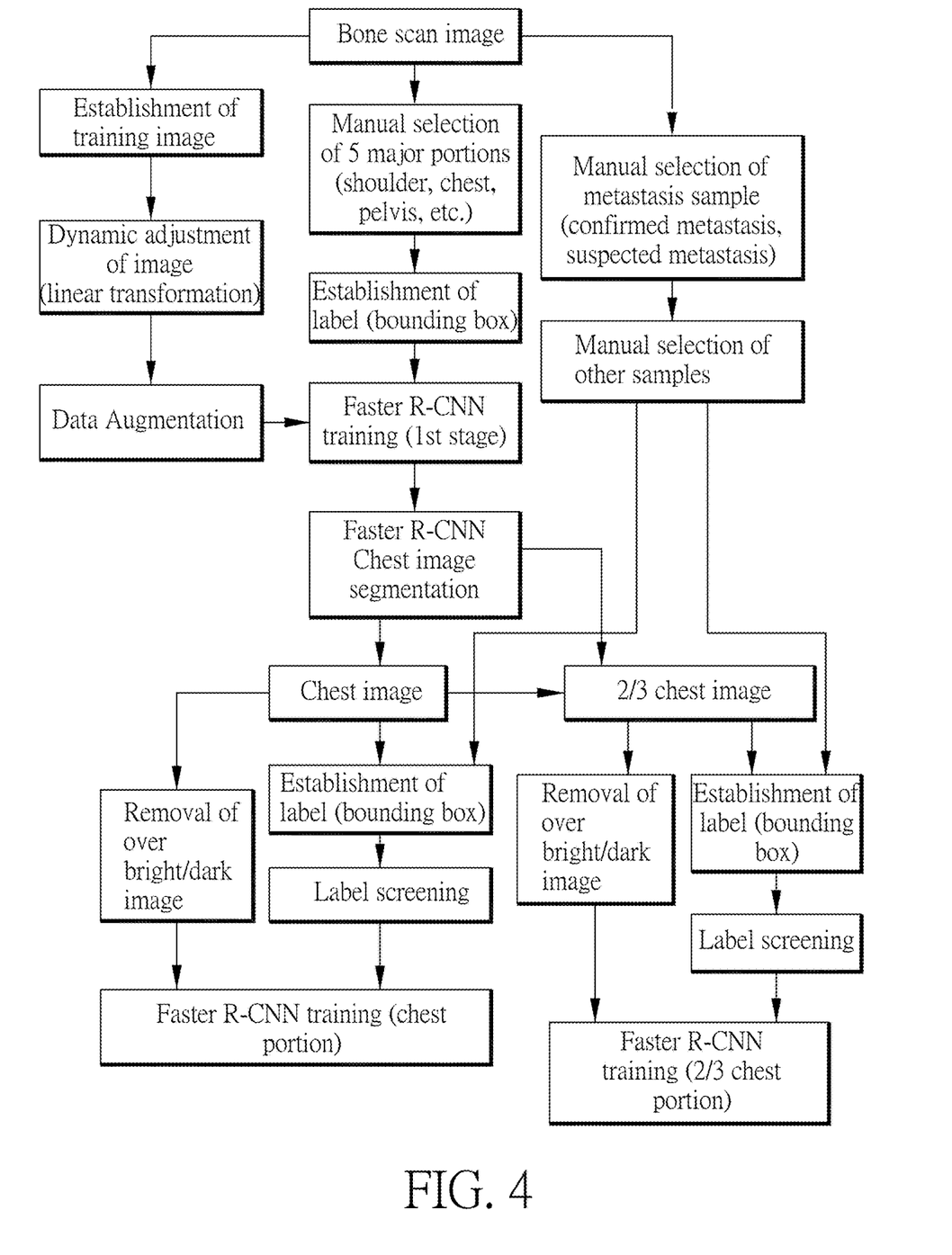
FIG. 4 is a flowchart of chest network according to an embodiment of the present disclosure.

The chest portion network module 131 uses faster R-CNN to perform prediction of prostate cancer bone metastasis on bone scan images. The overall flowchart is shown as in FIG. 4. For convenience of explanation, the network training method is primarily divided into two steps as follows:

(1) establishing the first stage faster R-CNN (1st); inputting the whole body bone scan images; detecting the rib portion and circling the size range (bounding box); and segmenting the image containing only the chest portion, as shown in FIG. 2(D), for serving as the training image of step (2);

(2) using the image generated in step (1) as the training image; retaining the metastasis points in the range of the ribs in step (1) and the additional circled labels (normal portions) to establish bounding boxes (labels); and training the second stage faster R-CNN (2nd R-CNN) to circle the positions of bright points in the chest and categorize the lesions of cancerous bone metastasis, while excluding the bright points unrelated to cancerous bone metastasis, wherein, if the image does not have the bright points circled in the second stage, the image is determined not to be cancerous bone metastasis.

The aforementioned step (2) establishes two faster R-CNNs to perform identification of chest metastasis points, including a faster R-CNN covering the entire range of the chest and a faster R-CNN covering only ⅔ of the center of the chest. The latter network will enlarge the image twice for input, and only input small metastasis points as training samples. The chest network has, for example, 200 sets of samples, including 156 sets of samples from prostate cancer bone metastasis patients and 44 sets of artificial simulation samples. The network training portion is, for example, 156 sets of real samples, including 52 sets of sample from confirmed bone metastasis images and 104 sets of samples without visible bone metastasis images.

Figure 5:
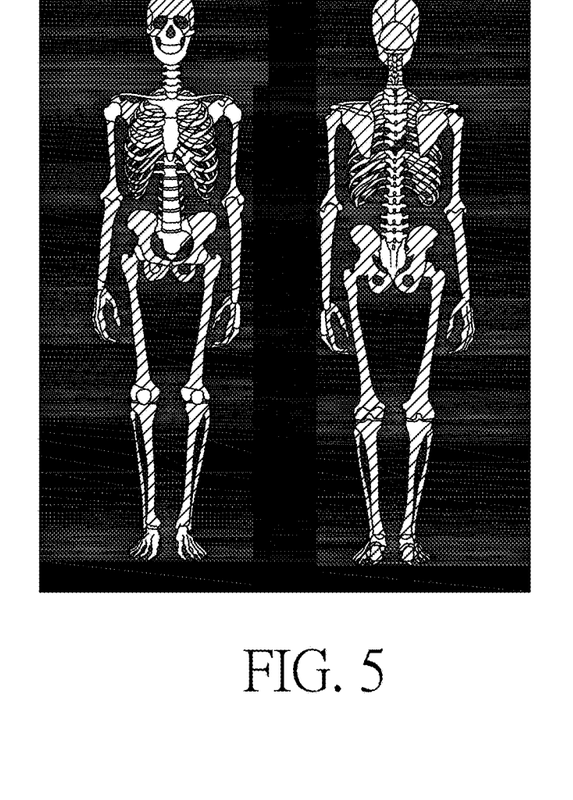
FIG. 5 is an artificial simulation image according to an embodiment of the present disclosure.

Among the artificial simulation samples, there are a total of 44 artificial simulation samples, including 10 rib metastasis point simulations, 10 spine metastasis point simulations, 10 injury simulations, and 14 metastasis image simulations. All simulated metastasis points are round dots with random deformation. The simulation image is produced by first looking for the image without metastasis or injury as the background image, and defining the radius for drawing round dots, the standard deviation of the Gaussian distribution, the number of drawn points, the minimum gray scale value of the bright points, and the brightness gray scale of the mirror drop. A center is given on the background image to generate the number of random brightness points of the Gaussian distribution (twice the number of drawn points) and the x and y coordinates of the Gaussian distribution of the number of drawn points. When being closer to the center, the brightness distribution of the tumor on the image is getting stronger and becomes spherical. Therefore, the points in the first half of the highest point of the Gaussian distribution are taken as the tumor bright points, and the bright point is linearly converted to be between the lowest gray scale of the bright point and 255. Then, the gamma correction is used to make the brightness distribution more extreme, as expressed in equation (5) in which h(r,c) is the image of g(r,c) after gamma correction and γ is set to be 0~1. The corrected values of bright points, and x and y coordinates are sorted, respectively. The bright point gray scale is given with the lowest value from the outermost x, y coordinates, and then is sequentially given until reaching the center x, y coordinates, so as to generate a hot zone. By adding 2 pixels to each of four sides (up, down, left and right) of the radius, a bounding box is established. At the mirror position, the same distribution is used, but the gray scale is given with the highest brightness from the center and is then sequentially given until the lowest brightness at the outer periphery, so as to reduce the brightness to generate a bounding box for completing the artificial metastasis points. Each image will be provided with a plurality of round dots for simulation so as to produce the artificial simulation image, as shown in FIG. 5, which is a simulation image of rib metastasis points. All artificial simulated images are confirmed by the doctors to make them conform to similar clinical images.

$$h(r, c) = 255 \times \left( \dfrac{g(r, c)}{255} \right)^{\gamma}, \gamma > 0 \quad (5)$$

Figure 6:
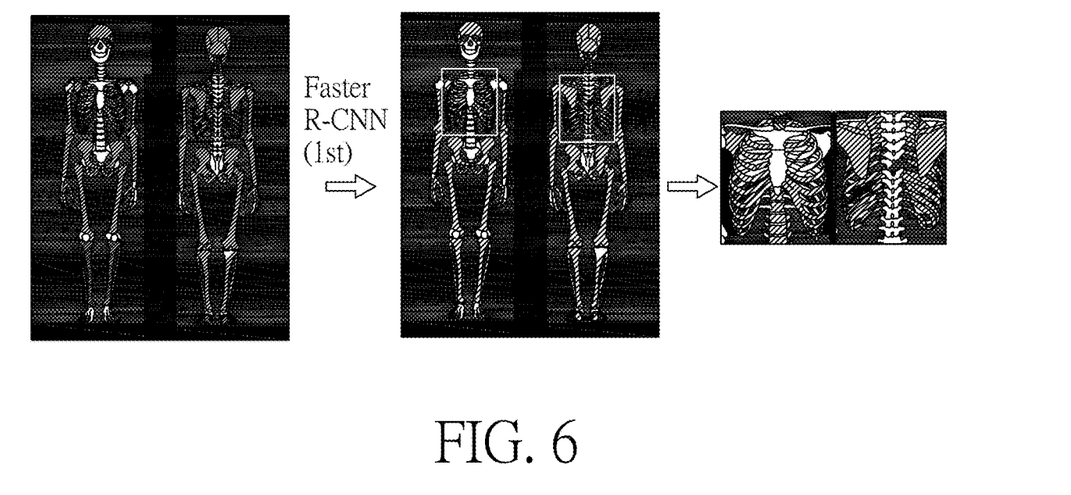
FIG. 6 is a flowchart of generating training image according to an embodiment of the present disclosure.

The chest range network is trained in the same way as the ⅔ chest range network. The image of chest is segmented as shown in FIG. 6. The whole body bone scan image is input, and the faster R-CNN established in the first stage is used to cut out two boxes and merge the two boxes, calculate the size of all merged images, record the maximum values of the width and height, adjust the image to this size, enlarge it in proportion until conforming to one side, and fill black background for the insufficient portion. An interval is generated in the middle to prevent the bounding boxes (labels) of the front and back surfaces from connection, which may affect the training, and the resultant image is used as a training image.

Figure 7:
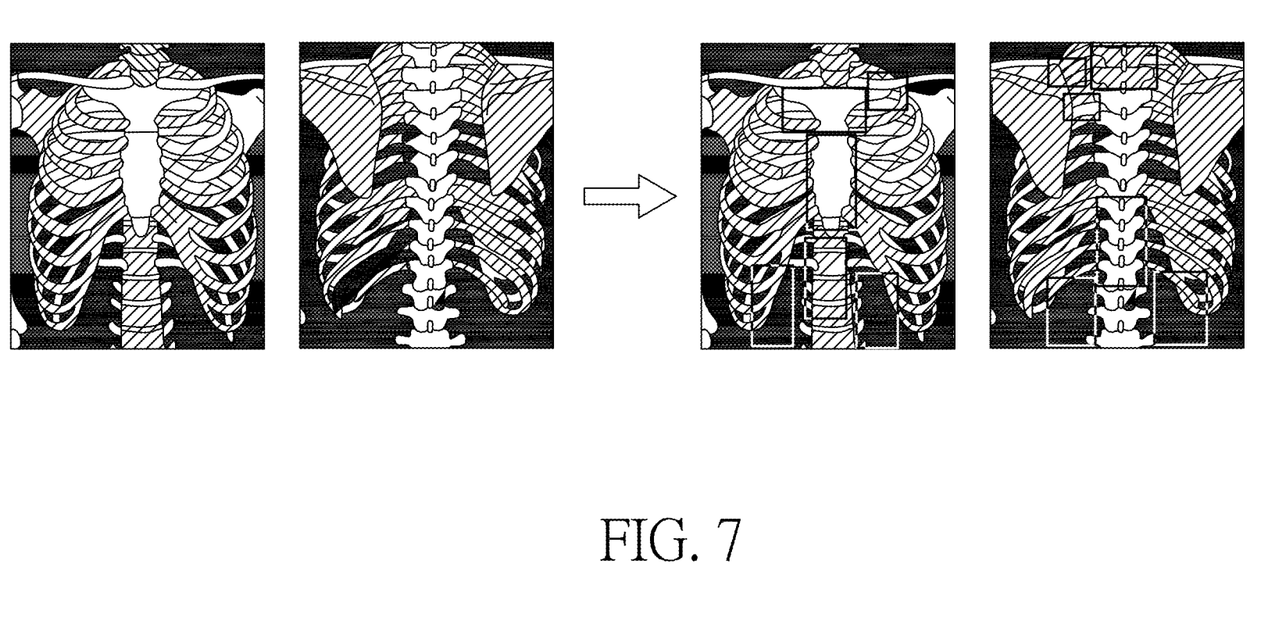
FIG. 7 is a flowchart of generating bounding box (label) according to an embodiment of the present disclosure.

Bone metastasis lesions, suspected bone metastasis lesions, and normal tissues are only retained in the chest range as a bounding box (label). As shown in FIG. 7, the part of the box that exceeds the image boundary will be adjusted to be within the image. In order to avoid the situation that the cut box produces a line or is too small, only the bounding box with the minimum length and width greater than 6 pixels.

Figure 8:
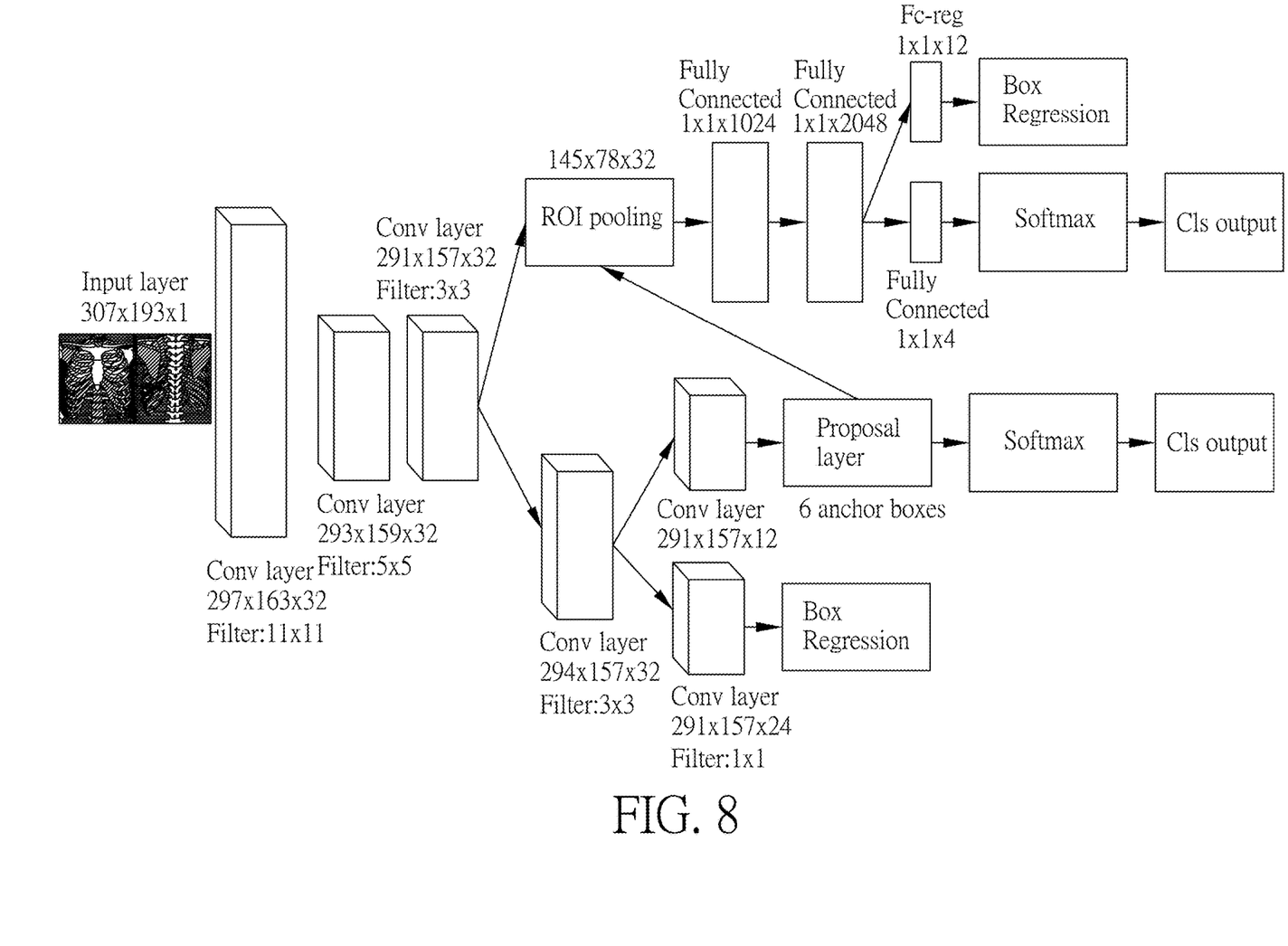
FIG. 8 shows a chest network architecture according to an embodiment of the present disclosure.

FIG. 8 shows the faster R-CNN architecture used by the chest portion network module 131, wherein the input is image and box coordinates, and the output includes (1) category: confirmed metastatic lesions, suspected metastatic lesions, other tissues, background; and (2) range boundary (bounding box). Before entering the RPN portion, a 3-layer convolutional layer is used and, after the ROI pooling layer, a fully connected layer is used. Since the neural network architecture of FIG. 8 is known to those skilled in the art, the detailed description therefor is deemed unnecessary.

Figure 2E:
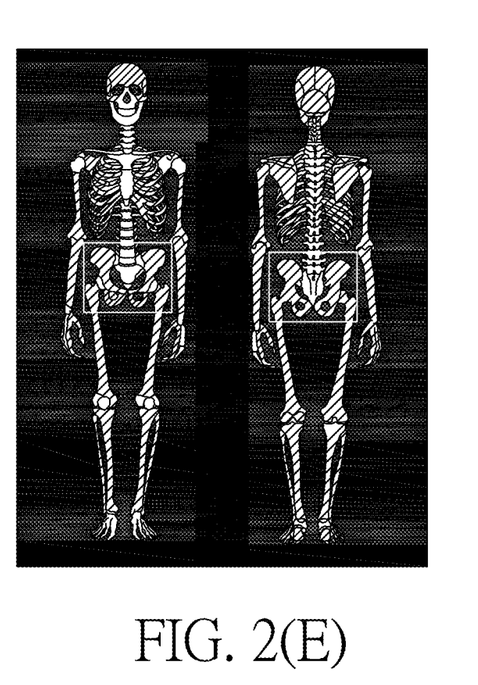
FIG. 2(E) schematically illustrates a label (bounding box) of pelvis according to an embodiment of the present disclosure.
Figure 9:
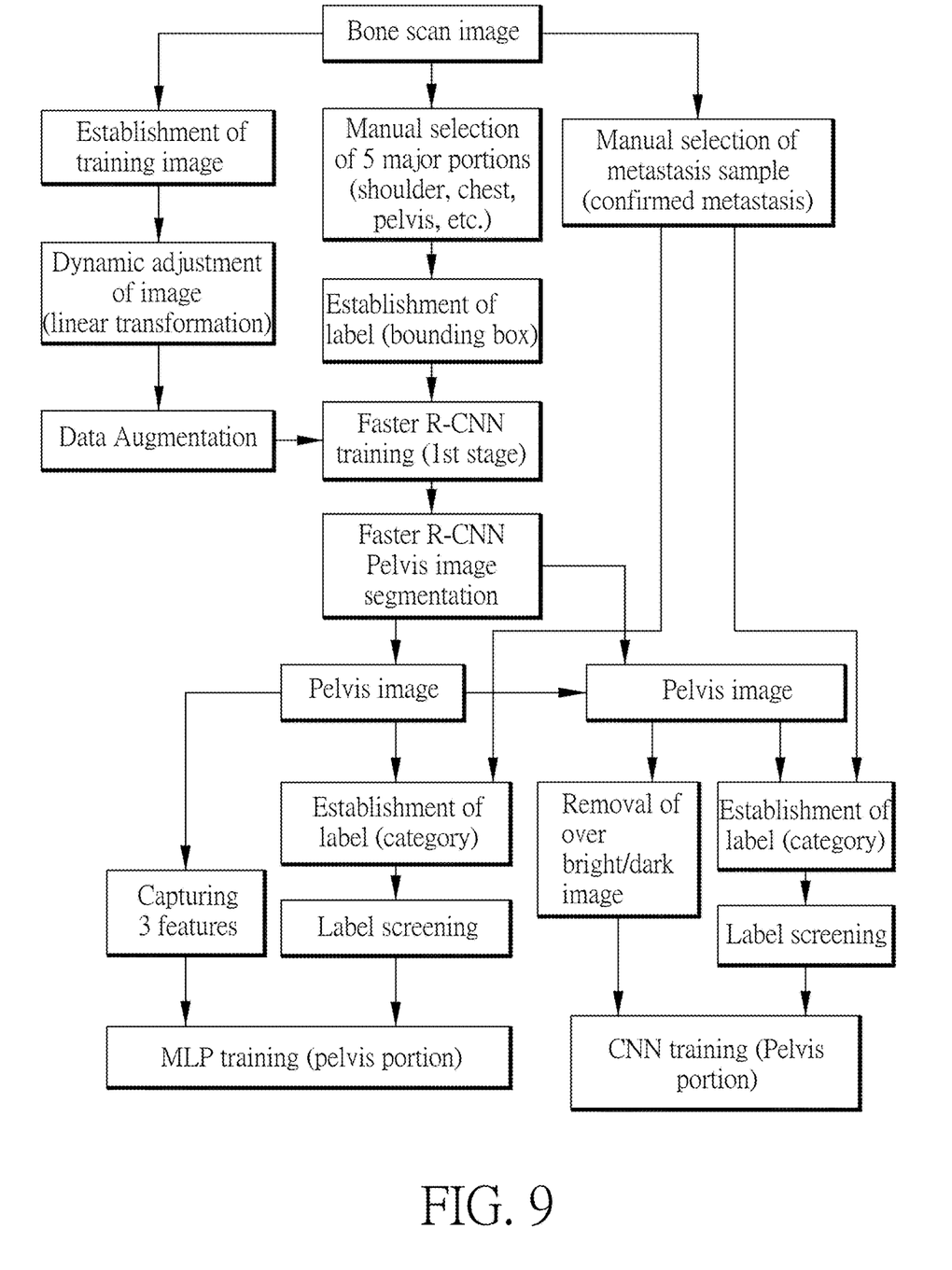
FIG. 9 is a flowchart of pelvis network according to an embodiment of the present disclosure.

The pelvis portion network module 132 uses a convolutional neural network to perform prediction of prostate cancer bone metastasis on bone scan images. The overall flowchart is shown as in FIG. 9. For convenience of explanation, the network training method is primarily divided into two steps as follows:

(1) establishing the first stage Faster R-CNN (1st); inputting the whole body bone scan images; detecting the pelvis portion and circling the size range (bounding box); and segmenting the image containing only the pelvis portion, as shown in FIG. 2(E).

(2) using the image generated in step (1) as the training image; retaining the metastasis points in the range of pelvis in step (1) and, if the image has metastasis points, defining the image as confirmed metastasis image, otherwise as normal image; establishing the category label divided into two categories including confirmed prostate cancer bone metastasis and no prostate cancer bone metastasis; and training the convolutional neural network. The pelvis network has, for example, a total of 156 sets of samples, including 50 sets of confirmed bone metastasis images and 106 sets of images without visible bone metastasis.

Figure 10:
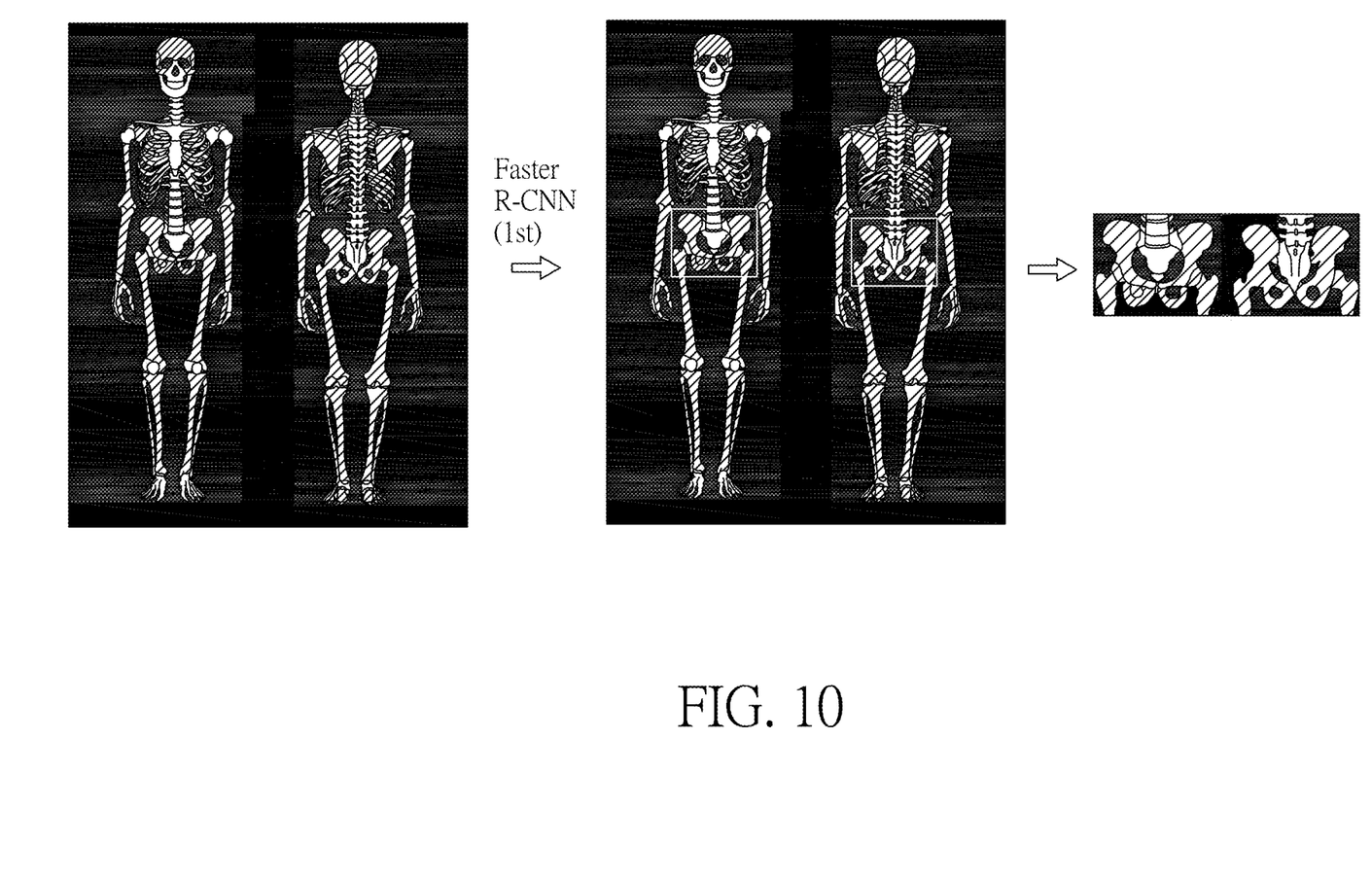
FIG. 10 is a flowchart of generating training image according to another embodiment of the present disclosure.

This network uses the entire pelvis area for training. The image of the pelvis is segmented as shown in FIG. 10. The whole body bone scan image is input, and the faster R-CNN established in the first stage is used to cut out two boxes and merge the two boxes, calculate the size of all merged images, record the maximum values of the width and height, adjust the image to this size, enlarge it in proportion until conforming to one side, and fill black background for the insufficient portion. An interval is generated in the middle, and the resultant image is used as a training image.

Figure 11:
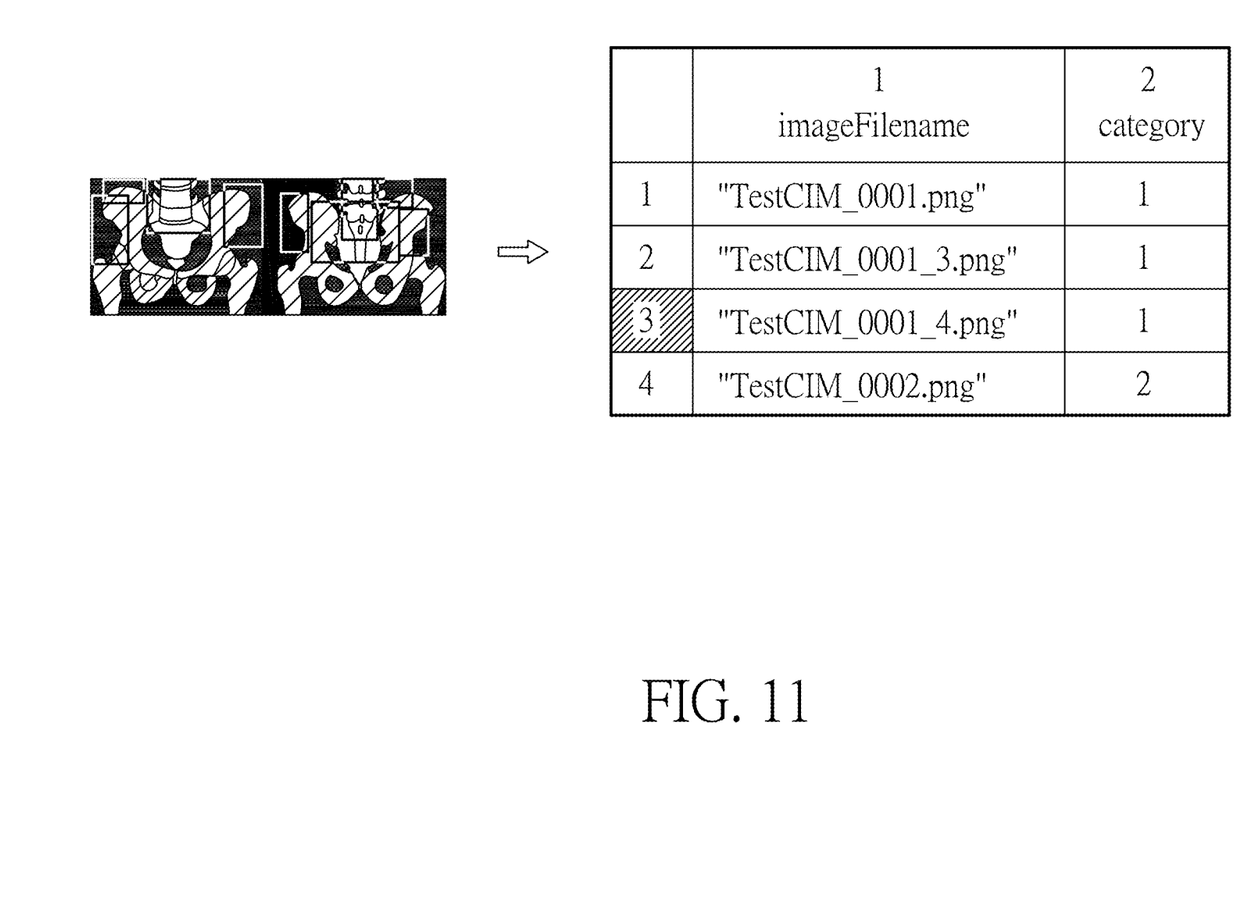
FIG. 11 is a flowchart of generating bounding box (label) according to another embodiment of the present disclosure.

The images are sorted into images with confirmed bone metastasis and images without bone metastasis. If there is bone metastasis within the pelvis range, the image is an image with confirmed bone metastasis, which is defined as category 1. If there is no bone metastasis, the image is an image without bone metastasis, which is defined as category 2. As shown in FIG. 11, a list of bounding boxes (labels) is shown on the right side.

Figure 12:
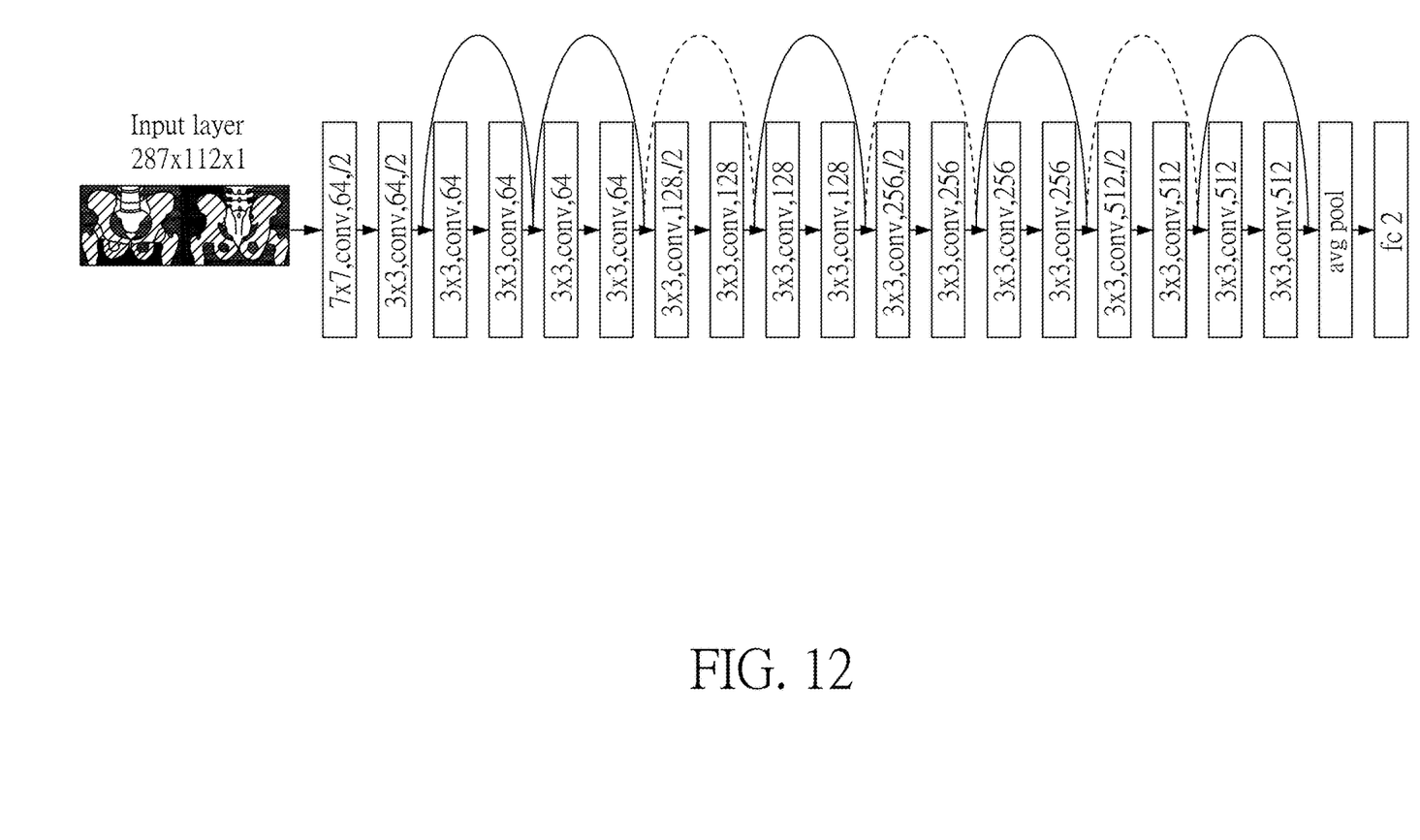
FIG. 12 shows a pelvis convolution neural network architecture according to an embodiment of the present disclosure.

The pelvis portion network module 132 may use the improved ResNet18 architecture. As shown in FIG. 12, the input image size is 287×112 (pixel pixel), and the output includes 2 types of images, which are the image with confirmed prostate bone metastasis, and the image without prostate bone metastasis image.

Through the system of deep learning neural network in prostate cancer bone metastasis identification based on whole body bone scan images in accordance with the present disclosure, an early diagnosis identification system can be established to assist the doctors in identifying prostate cancer bone metastasis, which can use a rectangular box to circle and select the hot zone of the metastasis type. After the system is mature, in the future, with this image presentation instead of text description, doctors in different departments are allowed to find the lesions on the image faster and more conveniently, so as to increase the overall working speed of the doctors. By using the deep learning method, it is able to continuously increase the content of the training database and improve the accuracy of the system, and eliminate the problem of having too few samples by adding artificial simulation images.

The aforementioned system of deep learning neural network in prostate cancer bone metastasis identification based on whole body bone scan images can be written as a software program in any suitable computer language, and be compiled or assembled for execution. The software program can be stored on any recording media that can be recognized and decoded by a processing unit, or any product comprising such a recording media. The recording media can be a hard disk, a flash disk, a floppy disk, an optical disk, a ZIP disk, an MO, an IC chip, RAM, or any other known product. As all of the detailed contents are completely described, there is no need for further explanation.

The aforementioned embodiments are examples only for convenience of description. The scope of the present disclosure is claimed hereinafter in the claims and is not limited to the embodiments.

What is claimed is:

1. A system of deep learning neural network in prostate cancer bone metastasis identification based on whole body bone scan images, comprising:
   a pre-processing module, which receives input whole-body bone scan images to perform processing; and
   a neural network module, which detects whether there is a prostate cancer bone metastasis based on the input whole body bone scan images, and includes:
   a chest portion network module, which establishes a first stage faster region-based convolutional neural network, segments training images of a chest portion based on the input whole body bone scan images, uses the training images to train a second stage faster region-based convolutional neural network, and categorizes lesions of cancerous bone metastasis; and
   a pelvis portion network module using a convolutional neural network, which establishes a first stage faster region-based convolutional neural network, segments training images of a pelvis portion based on the input whole body bone scan images, uses the training images to train the convolutional neural network used by the pelvis portion network module, and categorizes whether the pelvis portion is a bone metastasis image.

2. The system of deep learning neural network in prostate cancer bone metastasis identification based on whole body bone scan images as claimed in claim 1, wherein the pre-processing module performs dimension normalization, gray scale normalization and data augmentation on the input whole body bone scan images.

3. The system of deep learning neural network in prostate cancer bone metastasis identification based on whole body bone scan images as claimed in claim 2, wherein, in the dimension normalization, bone scan images of front side and back side are arranged to left and right, and are cut to a predetermined size, so as to normalize image size.

4. The system of deep learning neural network in prostate cancer bone metastasis identification based on whole body bone scan images as claimed in claim 2, wherein, in the gray scale normalization, linear conversion is used to automatically adjust a dynamic range of an image for being saved as a predetermined image format.

5. The system of deep learning neural network in prostate cancer bone metastasis identification based on whole body bone scan images as claimed in claim 2, wherein, in the data augmentation, by adjusting a dynamic range of an image, one image is adjusted to have multiple types of brightness contrast.

6. The system of deep learning neural network in prostate cancer bone metastasis identification based on whole body bone scan images as claimed in claim 1, wherein the chest portion network module detects rib portion and circle a size range based on the input whole body bone scan images, and segments the images containing only the chest portion as the training images.

7. The system of deep learning neural network in prostate cancer bone metastasis identification based on whole body bone scan images as claimed in claim 1, wherein, with the training images, the chest portion network module retains metastasis points in a range of ribs and additional circled labels to establish bounding boxes, and trains a second stage faster R-CNN to circle positions of bright points in a range of chest and categorize lesions of cancerous bone metastasis, while excluding bright points unrelated to cancerous bone metastasis.

8. The system of deep learning neural network in prostate cancer bone metastasis identification based on whole body bone scan images as claimed in claim 7, wherein, if an image does not have the bright points circled in the second stage, the image is determined not to be cancerous bone metastasis.

9. The system of deep learning neural network in prostate cancer bone metastasis identification based on whole body bone scan images as claimed in claim 7, wherein the chest portion network module establishes two faster R-CNNs to perform identification of chest metastasis points, including a faster R-CNN covering entire range of chest and a faster R-CNN covering only ⅔ of a center of chest.

10. The system of deep learning neural network in prostate cancer bone metastasis identification based on whole body bone scan images as claimed in claim 1, wherein the pelvis portion network module detects pelvis portion and circles a size range based on the input whole body bone scan images, and segments images containing only the pelvis portion as training images.

11. The system of deep learning neural network in prostate cancer bone metastasis identification based on whole body bone scan images as claimed in claim 1, wherein, with the training images, the pelvis portion network module retains metastasis points in a range of pelvis and, if an image has metastasis points, defines the image as confirmed metastasis image, otherwise as normal image, establishes category label, and trains a convolutional neural network to categorize whether there is bone metastasis image.

12. The system of deep learning neural network in prostate cancer bone metastasis identification based on whole body bone scan images as claimed in claim 1, wherein the pelvis portion network module uses an improved ResNet18 architecture.

13. A non-transitory computer readable memory media storing a software program for use in a computer device, the computer device having an operating system used for a system of deep learning neural network in prostate cancer bone metastasis identification based on whole body bone scan images, the software program comprising:
  a pre-processing module, which receives input whole-body bone scan images to perform processing; and
  a neural network module, which detects whether there is a prostate cancer bone metastasis based on the input whole body bone scan images, and includes:
  a chest portion network module, which establishes a first stage faster region-based convolutional neural network, segments training images of a chest portion based on the input whole body bone scan images, uses the training images to train a second stage faster region-based convolutional neural network, and categorizes lesions of cancerous bone metastasis; and
  a pelvis portion network module using a convolutional neural network, which establishes a first stage faster region-based convolutional neural network, segments training images of pelvis portion based on the input whole body bone scan images, uses the training images to train the convolutional neural network used by the pelvis portion network module, and categorizes whether the pelvis portion is a bone metastasis image.

* * * * *